Patented Dec. 11, 1923.

1,477,014

UNITED STATES PATENT OFFICE.

OTTO SOHST, OF HOCHST-ON-THE-MAIN, GERMANY, ASSIGNOR TO FARBWERKE VORM. MEISTER LUCIUS & BRÜNING, OF HOCHST-ON-THE-MAIN, GERMANY, A CORPORATION OF GERMANY.

PROCESS OF PREPARING SULPHONIC ACIDS OF THE ARYLIDES OF 2.3-OXYNAPHTHOIC ACID.

No Drawing.   Application filed May 13, 1922.   Serial No. 560,748.

*To all whom it may concern:*

Be it known that I, OTTO SOHST, a citizen of Germany, residing at Hochst-on-the-Main, Germany, have invented certain new and useful Improvements in a Process of Preparing Sulphonic Acids of the Arylides of 2.3-Oxynaphthoic Acid, of which the following is a specification.

I have found that the arylamides of 2.3-oxynaphthoic acid of the general formula

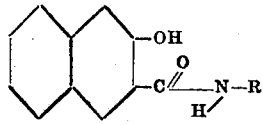

wherein R represents any aryl residue which may be substituted once or several times by a methyl-, chlorine-, nitro-, alkyloxy-, or any other group—can be easily converted by the action of sulfuric acid into hitherto unknown sulphonic acids which may be used for the manufacture of dyestuffs.

These sulphonic acids, to which the general formula:

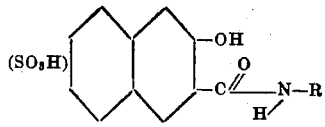

may be attributed, and which contain the sulfo group in the β-oxynaphthoic acid residue, are, when dry, generally light-grey powders. Their solution in hot water tends, after cooling, to solidify into a transparent gelatinous mass. Their alkali salts are readily soluble in water with a faint-yellow color.

The proportional quantities, the concentration of the sulfuric acid employed and the temperature to be chosen in the preparation of these sulphonic acids may be varied within wide limits.

The following examples illustrate my invention:

1. 20 kg. of β-oxynaphthoic acid anilide are introduced while stirring into about 90 kg. of sulphuric acid of 66° Bé and this mixture is heated for a short time to 50–90° C. until the whole is dissolved and a test, when put in a diluted solution of sodium carbonate, shows a clear solution. When pouring the product of the reaction after it has been cooled down to 20° C., into a salt solution, obtained from 75 kg. of common salt and 300 kg. of water, a voluminous light-grey precipitate results, which can be filtered off and, after being repeatedly treated with a salt solution and filtered, directly used as a paste.

2. 30 kg. of β-oxynaphthoic acid-4-chlor-2-toluidide are introduced while stirring into about 90 kg. of sulfuric acid monohydrate and this mixture is heated for a short time to 90° C. until the whole is clearly dissolved and a test, when put in a diluted solution of sodium carbonate, shows a clear solution. The product thus obtained is cooled down to 20° C. and poured into a salt solution prepared from 75 kg. of common salt and 300 kg. of water, whereupon the sulphonic acid separates in the form of a light-grey, granular precipitate which can be filtered off, washed with a solution of common salt and dried. It yields a light-grey powder which is readily soluble in hot water. On cooling, the solution solidifies so as to form a transparent jelly. Its solution rendered alkaline with sodium carbonate has a faint-yellow color. If instead of the above mentioned β-oxynaphthoic acid-4-chlor-2-toluidide another arylide, such, for instance, as β-oxynaphthoic-ortho-anisidide or β-oxynaphthoic acid-m-nitranilide, are used, sulphonic acids of similar properties are obtained.

Having now described my invention what I claim is:

As new products, the sulphonic acids of the general formula:

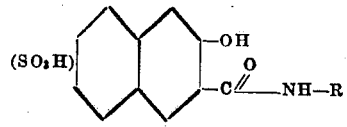

wherein R represents any aryl residue which may be once or several times substituted by a methyl-, chlorine-, nitro-, alkyloxy— or any other group and wherein the sulfo group is contained in the β-oxynaphthoic acid residue—which sulphonic acids can be obtained by treating the arylides of 2.3-oxynaphthoic acid with sulfuric acid and form, when dry, grey powders the solution of which in hot water generally solidifies into a transparent gelatinous mass, their alkali salts being readily soluble in water with a faint yellow colour.

In testimony whereof, I affix my signature.

OTTO SOHST.